(12) United States Patent
Olson et al.

(10) Patent No.: US 6,261,700 B1
(45) Date of Patent: Jul. 17, 2001

(54) CERAMER CONTAINING A BROMINATED POLYMER AND INORGANIC OXIDE PARTICLES

(76) Inventors: David B. Olson; Bettie C. Fong; Soonkun Kang; David S. Arney; Zayn Bilkadi, all of P.O. Box 33427, St. Paul, MN (US) 55133-3427

(*) Notice: Subject to any disclaimer, the term of this patent is extended or adjusted under 35 U.S.C. 154(b) by 0 days.

(21) Appl. No.: 09/319,061

(22) PCT Filed: Dec. 30, 1998

(86) PCT No.: PCT/US98/27725

§ 371 Date: May 27, 1999

§ 102(e) Date: May 27, 1999

(87) PCT Pub. No.: WO00/06622

PCT Pub. Date: Feb. 10, 2000

(51) Int. Cl.[7] ............................. B32B 27/30; C08L 27/10; C08K 3/22; C08F 14/16
(52) U.S. Cl. ........................ 428/522; 525/330.7; 524/430; 524/431; 524/492; 524/497; 524/551
(58) Field of Search ........................ 428/522; 525/330.7; 427/162; 524/430, 431, 492, 497, 551

(56) References Cited

U.S. PATENT DOCUMENTS

| | | | |
|---|---|---|---|
| 4,438,190 | | 3/1984 | Ishimaru et al. ............ 430/281 |
| 4,578,445 | * | 3/1986 | Sakagami et al. . |
| 4,721,377 | * | 1/1988 | Fukuda et al. . |
| 4,871,819 | * | 10/1989 | Oonishi et al. . |
| 4,970,135 | * | 11/1990 | Kushi et al. . |
| 5,002,795 | | 3/1991 | Keough ...................... 427/44 |
| 5,147,752 | * | 9/1992 | Kato et al. . |
| 5,178,982 | * | 1/1993 | Kato et al. . |
| 5,310,577 | * | 5/1994 | Mase et al. . |
| 5,372,796 | | 12/1994 | Wellinghoff . |
| 5,494,949 | | 2/1996 | Kinkel et al. . |

FOREIGN PATENT DOCUMENTS 0 314 166 B1   5/1993   (EP) .

* cited by examiner

Primary Examiner—Tae H. Yoon
(74) Attorney, Agent, or Firm—Kimberly S. Zillig

(57) ABSTRACT

Described are coatings, composite structures containing coatings, and compositions for preparing and methods of preparing coatings and composite structures, wherein the compositions comprise inorganic oxide particles and polymerizable brominated compounds, and coatings comprise inorganic oxide particles and a brominated polymer.

13 Claims, 1 Drawing Sheet

CERAMER CONTAINING A BROMINATED POLYMER AND INORGANIC OXIDE PARTICLES

This application is a 371 of PCT/US98/27725 filed on Dec. 30, 1998.

FIELD OF THE INVENTION

This invention relates to abrasion or scratch resistant protective coatings, composite structures containing such coatings, and compositions for preparing and methods of preparing such coatings and composite structures.

BACKGROUND

Many important commercial products, including optically functional products such as lenses, light fibers, optical screens and filters, reflective sheeting, and the like, have structures or are prepared from materials that are susceptible to physical damage. Alternatively, there may exist some other reason why such products benefit from protection against physical or mechanical damage. To protect these products, a tough, abrasion resistant "hardcoat" layer may be coated and cured onto their structures.

Abrasion resistant hardcoats can include a polymeric binder matrix formed from a curable material, and inorganic oxide materials suspended or dispersed within the polymeric binder. See, e.g., WO 96/36669 A1, which describes a hardcoat formed from a "ceramer" used, in one application, to protect the surfaces of retroreflective sheeting from abrasion. As is known in the art of ceramer compositions, ceramers can be derived from aqueous sols of inorganic colloids according to a process in which a curable binder precursor and other optional ingredients are blended into the aqueous sol. The resulting curable composition is dried to remove substantially all of the water. Solvent may then be added, if desired, in amounts effective to provide the composition with viscosity characteristics suitable for coating the composition onto a desired substrate. After coating, the composition can be dried to remove the solvent, and then exposed to a suitable source of energy to cure the binder precursor.

Optically functional products can include coatings having the primary function of enhancing or reducing light reflectance from the surface of a substrate. When such a coating reduces the amount of light reflected by the substrate, it is called "antireflective." When the coating enhances the amount of light reflected by the substrate it is called "reflective."

Antireflective (AR) coatings in particular are becoming increasingly important in commercial applications. The transparency of plastic or glass, in the form of doors, windows, lenses, filters, display devices (e.g., display panels) of electronic equipment, and the like, can be impaired by glare or reflection of light. To reduce the amount of glare on plastic or glass, the surface can include a layer of a metal oxide (such as silicon dioxide or indium tin oxide (ITO)), or suitably alternating layers of metal oxides, such as ITO/$SiO_2$. For example, glass surfaces can typically have about 4% surface reflection, but with the aid of specialized coatings, such as multilayers of sputter deposited ITO/$SiO_2$, surface reflection can be reduced to less than about 0.5% in the visible region of the spectrum (400–700 nm).

Importantly, the reflectivity or antireflectivity of a multilayer optically functional composite article depends not only on the reflectivity of each layer, but also on the relative refractive indices of layers that are adjacent within the composite structure. Adjacent layers having similar or identical refractive indices will cause little or no additional reflection. But, if the indices of refraction of adjacent layers of a multilayer optically functional composite are different, this will cause reflectance of light at the interface of such adjacent layers, and diminish antireflective properties.

There is a need for chemical compositions that can function as abrasion-resistant "hardcoat" compositions. There exists an even more specific need for such hardcoats having optical properties (e.g., specific indices of refraction) wherein the hardcoat composition can be useful in optical product applications, for example in optically functional composites having reflective or antireflective properties.

SUMMARY OF THE INVENTION

In brief summary, the invention provides ceramer compositions, ceramer solutions, hardcoat compositions, and optically functional composite structures including the hardcoat compositions. The ceramer compositions contain ingredients including inorganic oxide particles and a curable binder precursor, wherein the binder precursor includes a polymerizable brominated compound. The polymerizable brominated compound can contain a brominated monomer having a relatively high index of refraction, e.g., at least about 1.5, and/or can contain at least one aromatic, brominated (meth)acrylate compound. The ceramer composition can be cured or polymerized to form a hardcoat composition including a brominated polymeric matrix having dispersed therein, or surrounding the inorganic oxide particles. The ceramer and hardcoat compositions can have desirable physical (e.g., mechanical) and optical properties such as hardness, scratch and abrasion resistance, and index of refraction. A desired index of refraction may be one that is sufficiently high (e.g., maximized), or one that is appropriately chosen to match an adjacent layer of a multilayer composite, e.g., to match a substrate to which the ceramer composition is coated.

An aspect of the invention relates to a chemical composition including inorganic oxide particles and an aromatic, brominated (meth)acrylate compound. The binder precursor may further contain polymerizable non-brominated compounds, and may further comprise a coupling agent, an organic or aqueous solvent, or both.

A further aspect of the invention relates to a chemical composition containing inorganic oxide particles and a polymerizable brominated compound, wherein the polymerizable brominated compound exhibits an index of refraction of at least about 1.5.

Yet a further aspect of the invention relates to a cured hardcoat composition including a brominated polymer and inorganic oxide particles, wherein the polymer includes monomeric units derived from a polymerizable composition including a polymerizable brominated compound having an index of refraction of at least about 1.5.

Yet a further aspect of the invention relates to a cured hardcoat composition including a brominated polymer and inorganic oxide particles, wherein the polymer includes monomeric units derived from a polymerizable composition including a polymerizable, aromatic, brominated (meth)acrylate compound.

Yet a further aspect of the invention relates to a composite structure including a substrate and a hardcoat composition, wherein the hardcoat includes inorganic oxide particles and a brominated polymer. The brominated polymer comprises monomeric units derived from a polymerizable composition comprising brominated monomers such as a brominated compound having an index of refraction of at least about 1.5, and/or a polymerizable, aromatic (meth)acrylate compound. The composite structure can include other layers or components including a primer layer, an antireflective layer, or one or more other optically functional layers. These composite structures can be used as optical products such as antireflective composite structures.

As used within the present description, the following terms shall have the given meanings.

"Ceramer composition" or "ceramer" refers to any mixture comprising substantially non-aggregated, colloidal or suspended inorganic oxide particles dispersed in a curable binder precursor. The ceramer composition can optionally contain a coupling agent, and can optionally contain organic or aqueous solvent. A ceramer composition diluted with solvent, e.g., to facilitate processing and coating onto a substrate, can be referred to as a "ceramer solution."

"Curable" refers to a material that can be thickened or solidified e.g., by heating to remove solvent, heating to cause polymerization, chemical crosslinking, radiation polymerization or crosslinking, or the like.

"Cured" means a curable material that has been so thickened or solidified.

"Polymerizable" refers to chemical compounds such as monomers, dimers, trimers, oligomers, pre-polymers, or polymers etc., and chemical compositions, capable of undergoing chemical reaction (e.g., via unsaturated moieties) to produce a higher molecular weight material such as a polymer, copolymer, or polymeric or copolymeric material.

"(Meth)acrylate" refers to both acrylate and methacrylate compounds.

"Hardcoat," as in "hardcoat composition," refers to a composition comprising a polymeric matrix surrounding or containing inorganic oxide particles. A hardcoat composition can be prepared, for example, by curing or polymerizing a ceramer composition such that the binder precursor forms a polymeric matrix having inorganic oxide particles contained or dispersed therein.

DETAILED DESCRIPTION

Binder Precursor

Figure 1:
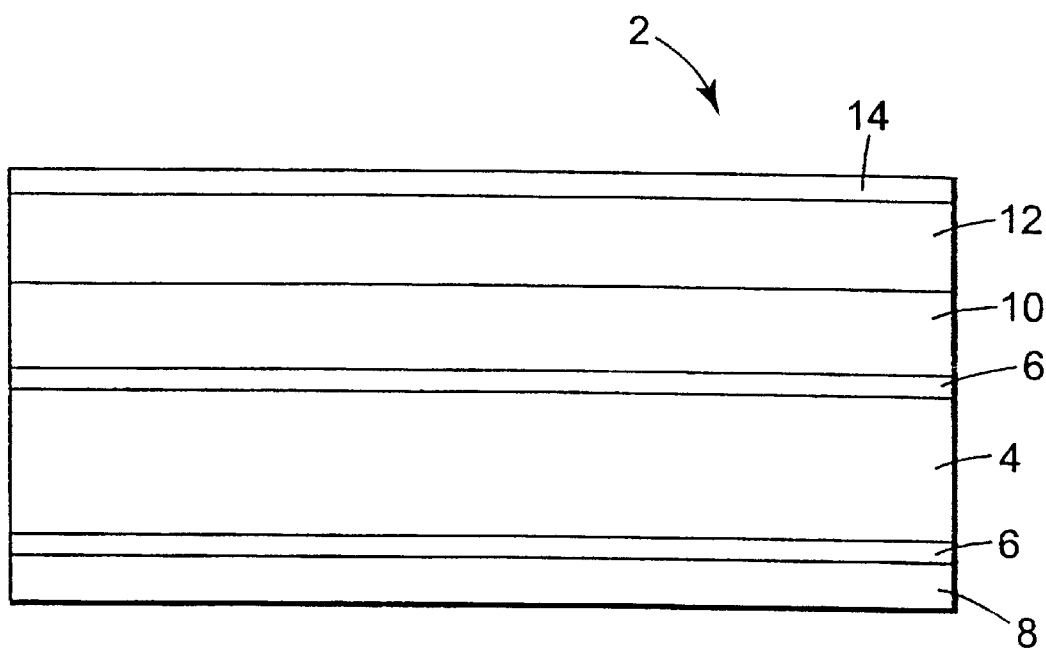
FIG. 1 illustrates a side plan view of an antireflective film composite structure including the hardcoat composition of the present description.

The ceramer composition includes a curable binder precursor comprising any of a variety of polymerizable chemical compounds or materials, e.g., monomers, oligomers, prepolymers, or polymers, etc. According to the invention, the binder precursor includes a polymerizable brominated compound such as a high index of refraction polymerizable brominated compound (e.g., having an index of refraction of at least 1.5), and/or a polymerizable aromatic, brominated (meth)acrylate compound (compound means e.g., monomer, dimer, trimer, oligomer, pre-polymer, or polymer etc.). The term "binder precursor," as used within the present description, means reactive ingredients of a ceramer composition that can be reacted to form a polymeric matrix. This includes specifically the polymerizable brominated compound, monofunctional and multifunctional non-brominated polymerizable compounds if used, as each is described infra, and does not include inorganic oxide particles, solvent, any coupling agent (whether reactive or not with the polymerizable compounds), or other ingredients that cannot react to form the polymeric matrix.

The components of a binder precursor can be chosen to provide a ceramer or hardcoat composition having desired physical, optical, and mechanical properties, and can preferably be chosen to provide a binder precursor having a desired refractive index, e.g., in the range from about 1.3 to about 1.7.

Polymerizable Brominated Compound

The binder precursor contains a polymerizable brominated compound such as a polymerizable brominated compound having an index of refraction of at least 1.5, or an aromatic, brominated (meth)acrylate compound. Preferred polymerizable brominated compounds can exhibit indices of refraction above about 1.52, 1.53, or 1.55.

Particularly preferred polymerizable brominated compounds comprise polymerizable aromatic, brominated (meth)acrylate compounds having an aromatic portion, a brominated portion (which may or may not be the aromatic portion), and a (meth)acrylate moiety. An aromatic, brominated (meth)acrylate compound may be mono-functional or multi-functional with respect to the (meth)acrylate moiety, and can exhibit chemical and physical properties that facilitate preparation of ceramer compositions and cured hardcoat compositions having desired properties.

The index of refraction of an aromatic, brominated (meth)acrylate compound, and of a ceramer or hardcoat composition prepared from an aromatic, brominated (meth)acrylate compound, can be affected by the chemical identity of the aromatic portion of the compound, and by the amount and position of bromine. Bromine generally increases the index of refraction of an aromatic (meth)acrylate compound. Bromine can be present on an aromatic, brominated (meth)acrylate compound at any useful position, and in any amount sufficient to provide a desired index of refraction.

In some applications the polymerizable brominated compound, e.g., a polymerizable, aromatic brominated (meth)acrylate compound, can preferably have a relatively low melting point to reduce the melting point of the binder precursor and the ceramer composition, and thereby facilitate reduced temperature processing of a ceramer composition or ceramer solution. Some preferred aromatic, brominated (meth)acrylate compounds, e.g., some monomers of formulas 2 and 3 infra; can exhibit relatively low melting points, e.g, below about 60 degrees Celsius (60 C.), more preferably below about 35 C. or 30 C., even more preferably below about 25 C., and most preferably can exist in a liquid state at about room temperature (e.g., 23 C.). Preferably, an aromatic, brominated (meth)acrylate compound can also be soluble or miscible in one or more other ingredients of the ceramer composition, most preferably at room temperature.

An example of a preferred class of polymerizable aromatic, brominated (meth)acrylate compound is the class of aromatic, brominated (meth)acrylate monomers comprising a six-membered phenyl group preferably substituted by one or more bromine substituents, and most preferably substituted by an alkyl substituent. The aromatic portion of the monomer may be connected directly to the (meth)acrylate moiety, (e.g., see formula 2, infra), or the aromatic portion may be connected to the (meth)acrylate moiety through a divalent organic linking group (L) (e.g., see formulas 1 and 3, infra). The linking group (L) can be any substituted or unsubstituted divalent organic group, and is preferably a straight or branched, substituted or unsubstituted alkylene (e.g., methylene), alkoxylene, or polyalkoxylene.

An example of a class of particularly preferred aromatic, brominated (meth)acrylate monomers are mono-functional brominated (meth)acrylate monomers:

(1)
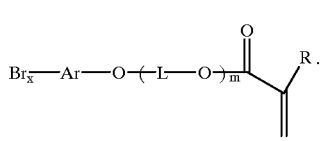

In formula 1, x represents the number of bromine substituents attached to the aromatic group (Ar); when Ar is a six membered ring, x can be in the range from 1 to about 5. Ar can be substituted by other chemical substituents, such as an alkyl. L is a divalent linking group; R can be hydrogen or methyl; and m is an integer from zero to one.

A preferred sub-class of brominated (meth)acrylate monomer includes those of formula 1 wherein L is absent and the aromatic portion of the monomer comprises a brominated, alkyl-substituted phenyl moiety. These monomers can be referred to as (alkyl,bromo)phenyl (meth)acrylate monomers, and can be described according to formula 2:

(2)
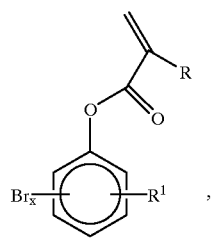

wherein R can be hydrogen (—H) or methyl (—CH$_3$), x can be in the range from 1 to about 4 and is preferably about 2, and R$^1$ can be a straight or branched alkyl, positioned ortho, meta, or para to the ester. Specific examples of brominated monomers according to formula 2 include those having an alkyl group located ortho to the ester substituent:

(2.1)
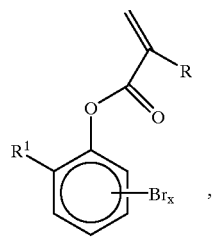

wherein R, x, and R$^1$ are defined supra. In a particularly preferred embodiment, bromines are located at the 4 and 6 positions on the aromatic ring, ortho and para to the ester substituent:

(2.2)
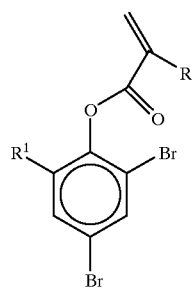

Particular monomers according to formula 2.2 include 4,6-dibromo-2-alkyl phenyl (meth)acrylates wherein the alkyl has from about 3 to 4 carbons, including the following: 4,6-dibromo-2-sec-butyl phenyl (meth)acrylate, (2.2.1)
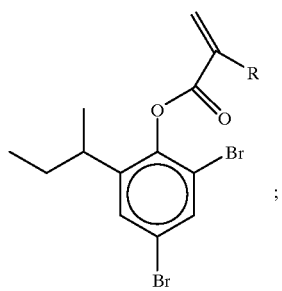

4,6-dibromo-2-tert-butyl phenyl (meth)acrylate, (2.2.2)
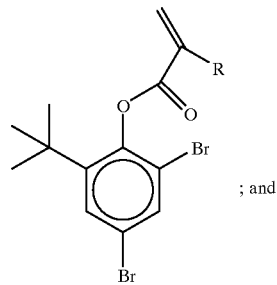

; and 4,6-dibromo-2-isopropyl phenyl (meth)acrylate, (2.2.3)
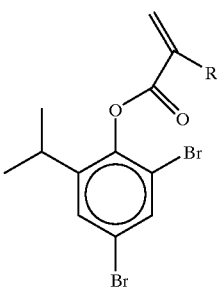

A second sub-class of preferred aromatic, brominated (meth)acrylate monomers includes monomers of formula 1 wherein L comprises a divalent linking group, and m is one. The aromatic ring preferably being phenyl, and the aromatic ring being optionally and preferably substituted with bromine and an alkyl. Such monomers can be referred to as (alkyl,bromo)phenoxy alkylene (meth)acrylate monomers, as shown, e.g., by the structure of formula 3:

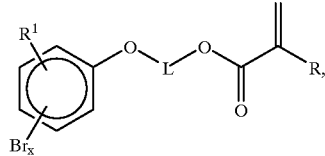

(3)

wherein R can be hydrogen or methyl, x can preferably be from 1 to about 4 and is more preferably about 2, L is a straight or branched alkylene of 1 to 12 carbons, and $R^1$ can be a straight or branched alkyl preferably having up to about 12 carbon atoms, positioned ortho, meta, or para to the phenyl oxygen. Examples of brominated monomers according to formula 3 can include monomers wherein $R^1$ is located ortho to the phenoxy oxygen, as illustrated by formula 3.1:

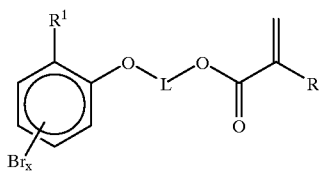

(3.1)

wherein, R, x, L, and $R^1$ are defined supra. In a particularly preferred embodiment, bromine atoms can be located at the 4 and 6 positions on the aromatic ring, ortho and para to the attached phenyl oxygen atom, as illustrated by formula 3.2:

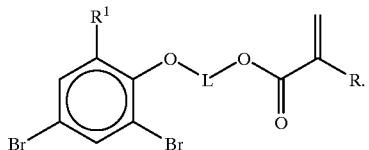

(3.2)

Particularly preferred monomers of formula 3.2 include 4,6-dibromo-2-alkyl phenyl alkylene (meth)acrylates wherein the $R^1$ alkyl has from about 3 to 4 carbons, including monomers of the types shown in formulas 3.2.1 and 3.2.2, wherein R and L are as defined:

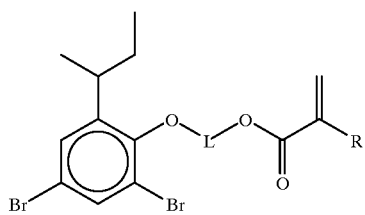

(3.2.1)

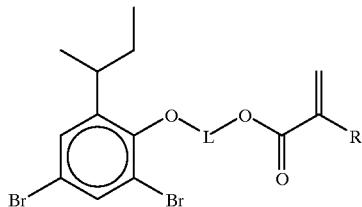

(3.2.1)

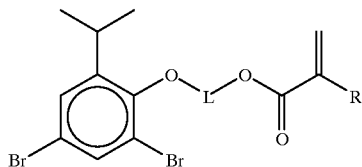

(3.2.2)

These and other aromatic, brominated (meth)acrylate monomers and methods for their preparation are described in Assignee's copending patent applications, U.S. Ser. No. 08/853,981, (filed May 9, 1997 and having Attorney's Docket Number 53247USA9A), and International Patent Application Number PCT/US98/18127 (filed Sep. 2, 1998 and having Attorney's Docket Number 54220PCT2A), each of which is incorporated herein by reference.

Other examples of polymerizable brominated compounds that can be useful in the binder precursor include but are not limited to tribromo phenyl (meth)acrylate, pentabromo phenyl (meth)acrylate, tribromo phenyl ethyl (meth)acrylate, bromo methyl styrene, and brominated bisphenol A (meth) acrylate compounds, including for example

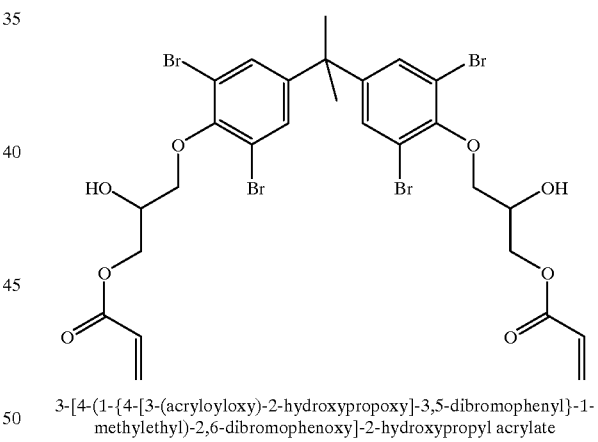

3-[4-(1-{4-[3-(acryloyloxy)-2-hydroxypropoxy]-3,5-dibromophenyl}-1-methylethyl)-2,6-dibromophenoxy]-2-hydroxypropyl acrylate Polymerizable brominated compounds, including those having an index of refraction of at least 1.5, as well as aromatic, brominated (meth)acrylate compounds, are commercially available, and can be prepared by methods generally known in the art of organic chemistry.

Brominated (meth)acrylate compounds can be prepared by functionalizing a (meth)acrylate moiety onto an acceptable brominated precursor. Brominated monomers of formula 1, e.g., bromo-phenyl (meth)acrylate monomers and alkyl bromo-phenyl (meth)acrylate monomers, can be prepared by reacting a brominated phenol (optionally alkyl-substituted) with a (meth)acrylate compound to attach the (meth)acrylate functionality to the phenol.

Brominated phenols are commercially available, and can be prepared by brominating a suitable phenol compound, such as an alkylphenol. Alkylphenols are commercially available from Schenectady International Inc., Chemical Division, Schenectady, N.Y. Phenols and alkylphenols can be brominated by methods that are generally known in the chemical art, and as described, for example, in the Kirk-Othmer Encyclopedia of Chemical Technology, Volume 4, 543 (4$^{th}$ ed. 1992). An example of this process, as exemplified with ortho-substituted alkyl phenols, can be represented as follows:

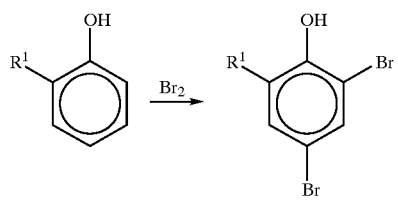

As will be appreciated by those skilled in the organic chemistry art, this bromination reaction can be useful to brominate other phenols or substituted phenols, and thereby produce other phenols, as desired, for further reaction toward an aromatic brominated (meth)acrylate compound.

A brominated aromatic alcohol such as a brominated alkylphenol can be esterified to produce a brominated alkylphenyl (meth)acrylate monomer by reaction with an appropriate acid chloride (e.g., a (meth)acryloyl chloride). The reaction between an alcohol and an acid chloride is well known in the chemical art, and is described, for example, in the Kirk-Othmer, Encyclopedia of Chemical Technology, Volume 9, 769 (4$^{th}$ ed. 1992); see also U.S. Pat. No. 3,845,102. Inhibitors, such as phenothiazine or 4-methoxyphenol (MEHQ), can be used during the reaction in an amount to provide protection from pre-polymerization of the monomer during its synthesis and storage, while not excessively influencing the subsequent polymerization.

With respect to preferred brominated monomers described herein, a brominated alkylphenol can be reacted with (meth)acryloyl chloride. Illustrated below is the production of an (alkyl, bromo)phenyl (meth)acrylate monomer:

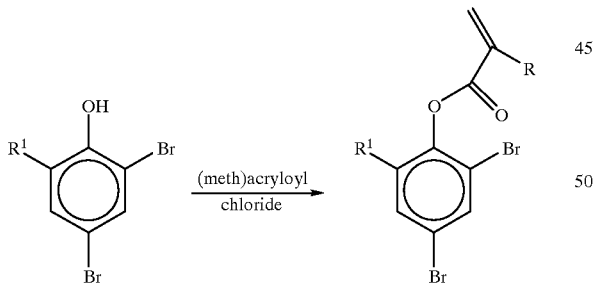

As will be appreciated by those skilled in the organic chemistry art, other brominated alkylphenol compounds can be reacted with (meth)acryloyl chloride to produce different alkyl,-bromo-substituted (meth)acrylate compounds.

Brominated monomers of formulas 1 and 3, which include a divalent organic linking group L, can be prepared by starting with a brominated aromatic alcohol, as described above, and reacting a linking group precursor (including a secondary reactive group such as an alcohol, allyl, or epoxy) onto the alcohol. A (meth)acrylate moiety can thereafter be attached to the organic linking group by reaction onto the secondary reactive group.

Specifically, compounds according to formula 1, including a divalent linking group L, can be prepared, e.g., by alkylating a brominated aromatic alcohol, by known methods, to produce an alkylated, brominated, aromatic alkanol compound (as illustrated below with respect to a bromine-substituted, alkyl-substituted phenol).

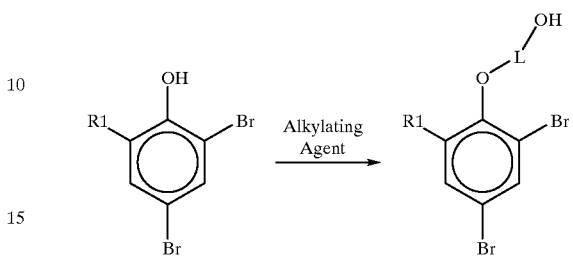

Alkylation methods are known in the art of organic chemistry, and are generally accomplished by introducing an alkylating agent, for example any one of an alkylene carbonate (e.g., ethylene carbonate), a chloroalkanol (e.g., chloroethanol), or an alkylene oxide (e.g., ethylene oxide), to a brominated aromatic alcohol, under proper conditions to allow the alkylating agent to react with the aromatic alcohol and cause alkylation. See, e.g., U.S. Pat. No. 2,448,767.

The resulting (alkyl,bromo)aromatic alkanol can be esterified to give a brominated (meth)acrylate monomer, in the exemplified case, an (alkyl,bromo)phenoxy alkylene (meth)acrylate monomer.

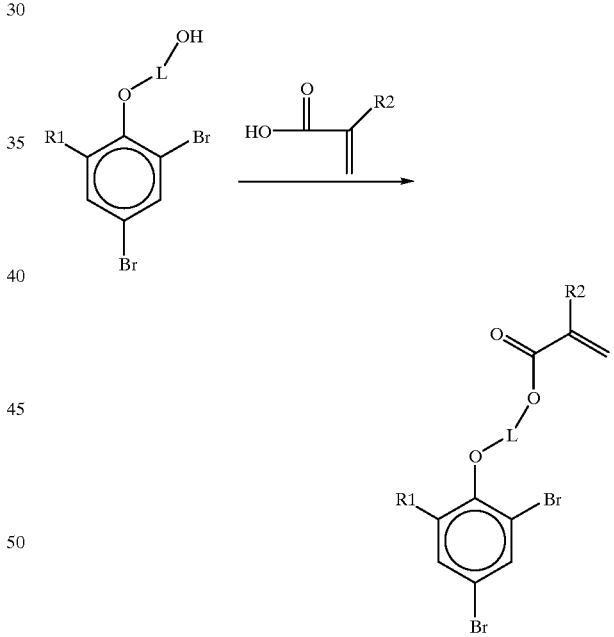

A binder precursor can include a polymerizable brominated compound comprising a reactive moiety different from a (meth)acrylate. For instance, a binder precursor can contain a brominated epoxy, a brominated olefinic compound, a brominated styrene, a brominated (meth)acrylamide, a brominated vinyl ether, a brominated vinyl ester, a brominated allyl ether, brominated alkyl ether, a brominated (meth)acrylonitrile, a brominated azalactone, a brominated N-vinyl carbazole, a brominated N-vinyl pyrrolidone, a brominated aziridine monomer, combinations of these, and the like.

Non-Brominated Compounds

The binder precursor can optionally include one or more polymerizable non-brominated compound (e.g., a monomer, dimer, oligomer, pre-polymer, or polymer) which can react with other components of the binder precursor to provide a brominated polymeric matrix. Polymerizable non-brominated compounds are known in the art of polymerizable compositions, polymers, and ceramer compositions. Polymerizable non-brominated compounds can be of any chemical nature that can be useful within a ceramer composition to react to form a polymerized matrix suitable to contain or surround inorganic oxide particles. Such non-brominated compounds can include low molecular weight reactive diluents which can modify flow properties of a ceramer composition, and multi-functional crosslinking agents to crosslink polymers upon reaction and provide a highly crosslinked matrix.

Polymerizable non-brominated compounds can be monofunctional or multi-functional with respect to the polymerizable moiety, and when multi-functional, the two or more polymerizable moieties can be the same or different. The polymerizable moiety or moieties can preferably be reactive with another polymerizable component of the binder precursor. Examples of suitable non-brominated compounds include monomeric compounds comprising a polymerizable moiety such as an olefin, a styrene, a vinyl ether, a vinyl ester, an allyl ether, an allyl ester, a (meth)acrylate, an acrylonitrile, a methacrylonitrile, a (meth)acrylamides, an azalactone, an N-vinyl carbazole, an N-vinyl pyrrolidone, an arizidine, an epoxy, or a combination thereof.

Preferred non-brominated compounds include (meth) acrylate monomers, e.g., alkyl and/or aryl (meth)acrylate compounds. The alkyl group of an alkyl (meth)acrylate compound can preferably contain on average 1 to about 14 carbon atoms. The alkyl group can optionally contain oxygen atoms in the chain, thereby forming ethers. Preferably, an aryl group can contain on average from about 6 to about 20 carbon atoms.

Examples of suitable monofunctional non-brominated polymerizable compounds include 2-hydroxyethyl (meth) acrylate, 2-methylbutyl (meth)acrylate, (meth)acrylic acid, itaconic acid, crotonic acid, maleic acid, fumaric acid, 2,2'-(ethoxyethoxy)ethyl (meth)acrylate, 2-hydroxypropyl (meth)acrylate, 3-hydroxypropyl (meth)acrylate, t-butyl (meth)acrylate, n-butyl (meth)acrylate, isobornyl (meth) acrylate, 2-(phenoxy)ethyl (meth)acrylate, biphenyl (meth) acrylate, t-butylphenyl (meth)acrylate, cyclohexyl (meth) acrylate, dimethyladamantyl (meth)acrylate, 2-naphthyl (meth)acrylate, and phenyl (meth)acrylate.

Useful non-brominated polymerizable compounds can also include, for example, N-vinyl pyrrolidone, N-vinyl caprolactam, and styrene monomers such as methyl styrene monomers including 3-methyl styrene, 4-methyl styrene, alpha methyl styrene, and mixtures thereof.

Non-brominated monofunctional acrylamide and methacrylamide ((meth)acrylamide) monomers can be useful to increase adhesion between a ceramer or hardcoat composition and certain substrates, such as polycarbonates and PET, and can improve water miscibility of a ceramer composition. Exemplary (meth)acrylamide monomers can have the formula:

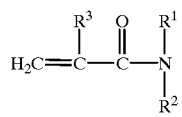

wherein $R^1$ and $R^2$ are each independently hydrogen, a $(C_1-C_8)$alkyl group optionally having hydroxy, halide, carbonyl, and amido functionalities, a $(C_1-C_8)$alkylene group optionally having carbonyl and amido functionalities, a $(C_1-C_4)$alkoxymethyl group, a $(C_4-C_{18})$aryl group, a $(C_1-C_3)$alk$(C_4-C_{18})$aryl group, and a $(C_4-C_{18})$heteroaryl group; with the proviso that only one of $R^1$ and $R^2$ is hydrogen; and $R^3$ can be hydrogen, a halogen, or a methyl group. Preferably, $R^1$ is a $(C_1-C_4)$alkyl group; $R^2$ is a $(C_1-C_4)$alkyl group; and $R^3$ is hydrogen or methyl. $R^1$ and $R^2$ can be the same or different. More preferably, each of $R^1$ and $R^2$ is —$CH_3$, and $R^3$ is hydrogen.

Examples of useful (meth)acrylamides include (meth) acrylamide, N-methylol (meth)acrylamide, N-hydroxyethyl (meth)acrylamide, diacetone (meth)acrylamide, N-ethyl-N-aminoethyl (meth)acrylamide, N-ethyl-N-hydroxyethyl (methacrylamide, N,N-dimethylol (meth)acrylamide, N,N-dihydroxyethyl (meth)acrylamide, dimethylaminoethyl (meth)acrylamide, N-octyl (meth)acrylamide (normal and branched), 1,1,3,3-tetramethylbutyl (meth)acrylamide, N-(3-bromopropionamidomethyl)(meth)acrylamide, N-tert-butyl(meth)acrylamide, N,N-dimethyl(meth)acrylamide, N,N-diethyl(meth)acrylamide, N-(5,5-dimethylhexyl) (meth)acrylamide, N-(1,1-dimethyl-3-oxobutyl)(meth) acrylamide, N-(hydroxymethyl)(meth)acrylamide, N-isobutoxymethyl)(meth)acrylamide, N-isopropyl(meth) acrylamide, N-methyl(meth)acrylamide, N-ethyl(meth) acrylamide, N-methyl-N-ethyl(meth)acrylamide, N-(fluoren-2-yl)(meth)acrylamide, N-(2-fluorenyl)-2-methyl(meth)acrylamide, 2,3-bis(2-furyl)(meth)acrylamide, and N,N'-methylene-bis(meth)acrylamide. A particularly preferred (meth)acrylamide is N,N-dimethyl acrylamide.

Multifunctional Polymerizable Non-Brominated Compounds

The binder precursor can further include a multifunctional polymerizable non-brominated compound; e.g., a monomer, dimer, oligomer, pre-polymer, polymer, etc., which can be useful, for example, to improve the amount of crosslinking within a hardcoat composition. Multifunctional non-brominated compounds are known in the art of organic chemistry (e.g., as crosslinkers), and in the art of polymers and ceramer compositions. A multifunctional non-brominated compound can be any multifunctional non-brominated compound that can react with the other components of the binder precursor to produce a polymer.

The multifunctional non-brominated compound can include any two or more polymerizable moieties such as those previously identified, which can be the same or different. Preferred multifunctional non-brominated compounds comprise ester (meth)acrylate compounds such as difunctional (meth)acrylate esters of a polyhydric alcohol, and combinations thereof. Of these, trifunctional and tetrafunctional esters of (meth)acrylate esters of polyhydric alcohol can be especially preferred.

Examples of suitable multifunctional ester (meth) acrylates include poly(meth)acrylic acid esters of polyhydric alcohols including, for example, the di(meth)acrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4, pentanediol, 1,4-cyclohexanediol, 1,6-hexamethylenediol, 1,2-cyclohexanediol, 1,6-cyclohexandimethanol; the tri (meth)acrylic acid esters of aliphatic triols such as glycerin, 1,2,3-propanetrimethanol, 1,2,4-butanetriol, 1,2,5-pentanetriol, 1,3,6-hexanetroil, and 1,5,10-decanetriol; the tri(meth)acrylic acid esters of tris(hydroxyethyl) isocyanurate; the tetra(meth)acrylic acid esters of aliphatic tetrols, such as 1,2,3,4-butanetetrol, 1,1,2,2,-tetramethylolethane, 1,1,3,3-tetramethylolpropane, and pentaerythritol, the tri(meth)acrylic acid esters of pentaerythritol, and the penta(meth)acrylic acid esters of dipentaerythritol; the penta(meth)acrylic acid esters of aliphatic pentols such as adonitol; the and hexa(meth)acrylic acid esters of hexanols such as sorbitol and dipentaerythritol; the di(meth)acrylic acid esters of aromatic diols such as resorcinol, pyrocatechol, bisphenol A, and bis(2-hydroxyethyl) phthalate; the tri(meth)acrylic acid ester of aromatic triols such as pyrogallol, phloroglucinol, and 2-phenyl-2,2-methylolethanol; and the hexa(meth)acrylic acid esters of dihydroxy ethyl hydantion; and mixtures thereof. Particularly preferred multifunctional ester (meth) acrylic acids can comprise a mixture of di-, tri-, and tetra (meth)acrylate esters of pentaerythritol.

The binder precursor can include amounts of polymerizable brominated compounds and mono- and multi-functional non-brominated compounds sufficient to provide a ceramer composition that can be processed, alone or in the presence of added solvent, to provide a useful hardcoat composition. While amounts outside of the following ranges may be useful, preferred binder precursors can include from about 20 to about 80 parts by weight (pbw) polymerizable brominated compound, e.g., aromatic, brominated (meth) acrylate compound, preferably about 30 to 50 pbw polymerizable brominated compound, based on 100 pbw of the binder precursor; preferably the binder precursor includes both mono- and multi-functional polymerizable brominated (meth)acrylate monomer, e.g., from about 10 to 20 parts by weight monofunctional polymerizable brominated compound and from about 20 to 30 pbw difunctional polymerizable brominated compound based on 100 pbw binder precursor. The binder precursor can also contain polymerizable non-brominated compound in useful amounts, e.g., from about 20 to 80 pbw, preferably about 50 to 70 pbw polymerizable non-brominated compound based on 100 pbw binder precursor; the non-brominated compound can include mono- and multi-functional materials, including preferably from about 10 to 20 pbw monofunctional polymerizable non-brominated compound and from about 40 to 50 pbw multifunctional polymerizable non-brominated compound based on 100 pbw of the binder precursor.

Coupling Agent

Optionally the ceramer composition can contain a coupling agent. The coupling agent is thought to provide a link, either by chemical bond or a lesser chemical interaction, between the polymeric matrix and inorganic oxide particles. A wide variety of coupling agents are known in the ceramer art, and a particular coupling agent can be selected for use in a given ceramer composition based on factors such as the chemical compositions of the binder precursor and the inorganic oxide particles. Exemplary coupling agents include organofunctional silane monomers and carboxylic acid-functional compounds.

Examples of coupling agents include carboxylic acids such as stearic acid, acrylic acid, oleic acid, silanes such as methyl trimethoxysilane, methyl triethoxysilane, phenyl trimethoxysilane, phenyl triethoxysilane, (meth) acryloxyalkyl trimethoxysilanes such as (meth) acryloyloxypropyl trimethoxysilane and (meth) acryloyloxypropyl trichlorosilane, phenyl trichlorosilane, vinyl trimethoxysilane, vinyl triethoxysilane, propyl trimethoxysilane, propyl triethoxysilane, glycidoxypropyl trimethoxysilane, glycidoxypropyl triethoxysilane, glycidoxypropyl trichlorosilane, and fluorinated or perfluorinated silane compounds such as perfluoroalkyl trimethoxysilane, perfluoroalkyl triethoxysilane, perfluoromethyl alkyl trimethoxysilanes such as tridecafluoro-1,1,2,2-tetrahydrooctyl trimethoxysilane, perfluoroalkyl trichlorosilanes, trifluoromethylpropyl trimethoxysilane, trifluoromethylpropyl trichlorosilane, and perfluorinated sulfonimido ethyl trimethoxysilane (available from the 3M company, St. Paul, Minn. under the trade designation FC 405), combinations of these, and the like.

Inorganic Oxide Particles

The ceramer composition can include colloidal inorganic oxide particles useful to alter (e.g., increase or control) the refractive index of the ceramer composition and the refractive index and physical and mechanical properties of a hardcoat prepared from the ceramer composition. Inorganic oxide particles can be crystalline in structure, and preferably have a relatively high index of refraction. The addition of a specific volume fraction of inorganic oxide particles to ceramer composition allows for a controllable increase of the refractive index of a ceramer composition and a hardcoat composition thereof. Specific examples of inorganic oxide particles include but are not limited to silica, alumina, titania, zirconia, ceria, and antimony oxide particles. The inorganic oxide particles are typically small in size, functionally being preferably large enough to provide a hardcoat having good and useful hardness properties, while at the same time having useful optical properties, e.g., having desired transmissivity, clarity or opacity, index of refraction, etc. While particles will generally include a distribution of a range of sizes, preferred particles can have an average particle diameter of about 5 nanometers (nm) to about 1000 nm, preferably from about 10 nm to about 50 nm, and most preferably from about 10 to 30 nm. Average particle size of inorganic oxide particles can be measured by known methods, e.g., by transmission electron microscopy. The inorganic oxide particles can most preferably be dispersible in a polymeric matrix in a substantially non-agglomerated form, and can preferably be readily dispersed and sterically stabilized in non-polar or polar solvents and organic monomers, e.g., the ceramer composition.

A variety of inorganic oxide particles are known and are described in the patent literature. (Meth)acrylate functionalized colloidal silica particles are described, for example, in U.S. Pat. No. 4,491,508 (Olsen et al.), U.S. Pat. No. 4,455,205 (Olsen et al.), U.S. Pat. No. 4,478,876 (Chung), U.S. Pat. No. 4,486,504 (Chung), and U.S. Pat. No. 5,258,225 (Katsamberis).

Inorganic oxide particles can be provided in any form that will allow their useful incorporation into a ceramer composition, such as in the form of a powder, or in the form of a liquid "sol." These forms of inorganic oxide particles are known in the art of inorganic oxide particles. The term "sol" as used within the present description refers to a colloidal dispersion of substantially non-agglomerated, inorganic oxide particles in a liquid medium. The liquid medium can be water or an organic solvent such as ethanol, methyl ethyl ketone, or an other organic solvent which may or may not be water-miscible. Solvent may be present in known amounts, e.g., 60 to 80 percent by weight of the sol.

Colloidal inorganic oxide particles dispersed as sols in aqueous solutions are available commercially, e.g., silica sols are available commercially under such trade names as LUDOX (E.I. DuPont de Nemours and Co., Wilmington, Del.), NYACOL (Nyacol Co., Ashland, Mass.), and NALCO (Nalco Chemical Co., Oak Brook, Ill.). Nonaqueous silica sols (also called silica organosols) are commercially available under the trade names NALCO 1057 (a silica sol in 2-propoxyethanol, Nalco Chemical Co.), NALCO 2327 and MA-ST, IP-ST, and EG-ST (Nissan Chemical Ind., Tokyo, Japan). Additional examples of suitable colloidal silicas are described in U.S. Pat. No. 5,126,394 (Bilkadi).

Ceramer Composition

The term "ceramer composition" refers to a composition minimally containing binder precursor and inorganic oxide particles, and optionally containing a coupling agent, solvent, and other optional ingredients as described. The ceramer composition can include any amounts of binder precursor, inorganic oxide particles, coupling agent, solvent, etc., that can be combined to form a useful ceramer composition.

The ceramer composition can contain any amount of binder precursor that, in combination with the other ingredients of the ceramer composition, will allow processing and coating of the ceramer composition into a useful hardcoat composition. Functionally stated, the amount of binder precursor should be sufficient to provide a ceramer composition that can be processed into a hardcoat composition that includes a polymeric matrix effective to bind inorganic oxide particles. A useful amount of binder precursor in a ceramer composition can generally be at least 20 parts by weight binder precursor based on 100 parts by weight ceramer solids ("ceramer solids" refers to the non-solvent portion of the ceramer composition). Preferred amounts of binder precursor can be in the range from about 45 to about 75 parts by weight, more preferably about 60 to 70 parts by weight binder precursor, based on 100 parts by weight ceramer solids. Within these ranges, preferred ceramer compositions can comprise from about 10 to 50 pbw polymerizable brominated compound, e.g., (alkyl, bromo) phenyl ester (meth)acrylate monomer, and from about 30 to 70 pbw non-brominated monomer based on 100 parts solids.

If used, a coupling agent can be included in a ceramer composition in an amount no greater than about 80 wt %, more preferably no greater than about 70 wt %, and most preferably no greater than about 60 wt % based on the weight of inorganic oxide particles. Alternatively stated, a coupling agent can be included in an amount of at least about 5 parts by weight, more preferably at least about 10 parts by weight, and most preferably, at least about 20 parts by weight based on 100 parts by weight ceramer solids.

The amount of inorganic oxide particles included in a ceramer composition can be chosen based on a number of factors such as desired processing properties of a ceramer composition and desired optical, physical, and mechanical properties of the ceramer and hardcoat compositions. The amount of inorganic oxide particles relative to binder precursor can be any amount useful to provide a processable ceramer composition and a functional, useful, hardcoat. Relatively higher amounts of inorganic oxide particles can improve hardness and refractive properties of a hardcoat. On the other hand, it may not be desired to achieve a maximum index of refraction, but instead a controlled level of refractivity, and excessive particles can prevent efficient or practical processing of a ceramer composition and can tend to make a hardcoat brittle. Generally practical amounts of inorganic oxide particles in a ceramer composition can be greater than zero and generally less than about 80 parts by weight inorganic oxide particles, e.g., less than about 60 pbw, based on 100 parts by weight ceramer solids. Depending on the application, preferred ceramer compositions may contain about 25 to 45 parts by weight, more preferably about 30 to 40 parts by weight inorganic oxide particles based on 100 parts by weight ceramer solids.

A ceramer composition prepared from only binder precursor, inorganic oxide particles, and optionally a coupling agent, without the addition of separate solvent, will generally include some but not a large amount of organic or inorganic solvent principally present due to the solvent's presence in one of the ingredients of the ceramer composition (e.g., if inorganic oxide particles are added in the form of a sol). Such a ceramer composition may or may not be easily or effectively processed to form a coated ceramer. Moreover, solvent initially present in these ingredients may be removed from a ceramer composition at some point during preparation or processing. Accordingly, aqueous or organic solvent may be added to the ceramer composition to facilitate processing. A ceramer composition containing added solvent, e.g., for purposes of improving processing or coating properties, can be referred to as a "ceramer solution."

The solvent can be aqueous or organic, and can be selected to be compatible with other components of the ceramer composition. As used in this context, compatibility between the solvent and the ceramer composition means that there is minimal phase separation between the solvent and the ceramer composition. Additionally, the solvent can be selected to not adversely affect the properties of the cured hardcoat, or undesirably affect (e.g., chemically attack) the substrate upon which a ceramer solution is coated.

Examples of suitable solvents include alcohols, preferably the lower alcohols such as isopropyl alcohol, n-butanol, methanol, ethanol, ketones such as methyl ethyl ketone, glycols, and combinations thereof. A particularly preferred solvent can include a majority of an alcohol, e.g., isopropyl alcohol, and a minor amount of water to facilitate processing and increase stability of the ceramer solution (a preferred weight ratio of alcohol to water can be from about 14:1 to about 16:1).

Solvent can be included in the ceramer composition in any amount useful to provide a ceramer solution that can be processed and coated to a useful degree. In general, the solids content of the ceramer solution can be anywhere in the range from about 5–99 weight percent solids, preferably from about 10–70 wt %, more preferably from about 30 to about 65 wt % solids, based on the total ceramer solution.

As will be appreciated by those skilled in the art of ceramer compositions, the ceramer composition can contain other useful ingredients such as a crosslinking agent, reaction initiator, one or more surfactant, pigment, filler, or other ingredients that can be useful within a polymerizable composition, ceramer composition, hardcoat composition, or optical product. Such ingredients can be included in the composition in amounts known to be effective for their respective purposes.

A crosslinking agent can be useful to increase the glass transition temperature of the polymer resulting from crosslinking the binder precursor or ceramer composition. Glass transition temperature of a composition can be measured by methods known in the art, such as Differential Scanning Calorimetry (DSC), modulated DSC (MDSC), or Dynamic Mechanical Analysis (DMA).

Polymeric beads, inorganic fillers, and/or pigments can be added to the ceramer composition in order to improve processing, to impart slip and scratch resistance to the polymerized material, or to affect optical properties of the polymerized material. Examples of useful polymeric beads include those made of polystyrene, polyacrylates, copolymers of styrene and acrylates, polyethylene, polypropylene, polytetrafluoroethylene, or combinations thereof. Examples of inorganic fillers and pigments include solid or hollow glass beads, and aluminum trihydroxide.

A reaction initiator can be included in the ceramer composition to facilitate polymerization or cure. To prepare a hardcoat from the ceramer composition, the ceramer composition can be exposed to an energy source to cause polymerization or cure, and the formation of a polymeric matrix surrounding and containing inorganic particles. Examples of suitable energy include radiant or thermal energy such as electromagnetic energy (e.g., infrared energy, microwave energy, visible light, ultraviolet light, and the like), accelerated particles (e.g., electron beam energy), and energy from electrical discharges (e.g., coronas, plasmas, glow discharge, or silent discharge). The curing or polymerization process of a (meth)acrylate ceramer composition typically occurs via a free radical mechanism, which can require the use of a free radical initiator (simply referred to herein as an initiator, e.g., a photoinitiator or a thermal initiator). If the energy source is an electron beam, the electron beam generates free radicals and no initiator is required. If the energy source is heat, ultraviolet light, visible light, or infrared light, an initiator can be required to effect efficient polymerization. When the initiator is exposed to one of these energy sources, the initiator generates free radicals, which then initiates polymerization and crosslinking.

Examples of suitable free radical thermal initiators include, but are not limited to, peroxides such as benzoyl peroxide, and azo compounds. Examples of photoinitiators that generate a free radical source when exposed to visible light radiation include, but are not limited to mixtures of camphorquinones and organic amines, and bisacyl phosphoric oxides. Examples of photoinitiators that generate a free radical source when exposed to ultraviolet light include, but are not limited to, organic peroxides, azo compounds, quinones, nitroso compounds, acyl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, and 4,4-bis(dimethyamino) benzophenone. Examples of commercially available ultraviolet photoinitiators include those available under the trade designations IRGACURE 184 (1-hydroxycyclohexyl phenyl ketone), IRGACURE 361 and DAROCUR 1173 (2-hydroxy-2-methyl-1-phenyl-propan-1-one) from Ciba-Geigy, Hawthorn, N.Y. Typically, if used, an amount of initiator is included in the precursor composition that is effective to achieve a desired level and rate of cure. Preferably, the initiator is used in an amount of about 0.1 wt % to about 10 wt %, and more preferably about 2 wt % to about 4 wt %, based on the total weight of the ceramer composition solids. Combinations of different initiators can be used if desired.

The ceramer composition can include a photosensitizer to facilitate the formation of free radicals that initiate curing of the binder precursor, especially in an air atmosphere. Suitable photosensitizers include, but are not limited to, aromatic ketones and tertiary amines. Suitable aromatic ketones include, but are not limited to, benzophenone, acetophenone, benzil, camphorquinone, benzaldehyde, and o-chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of initiator is included in the precursor compositions to effect the desired level and rate of cure.

Preferably, the amount of photosensitizer used in the compositions of the present invention is about 0.01 wt % to about 10 wt %, more preferably about 0.05 wt % to about 5 wt %, and most preferably, about 0.25 wt % to about 3 wt %, based on the weight of the ceramer solids. Combinations of different photosensitizers can be used if desired.

The ceramer composition can also preferably include a leveling agent to improve the flow or wetting of the ceramer composition onto a substrate. If the ceramer composition does not properly wet a desired substrate, this can lead to visual imperfections (e.g., pin holes and/or ridges). Examples of leveling agents include, but are not limited to, alkoxy terminated polysilicones such as that available under the trade designation DOW 57 (a mixture of dimethyl-, methyl-, and (polyethylene oxide acetate)-capped siloxane) from Dow Corning, Midland, Mich.; and fluorochemical surfactants such as those available under the trade designations FC430, FC431, and FX313 from 3M Co., St. Paul, Minn. Preferably, the leveling agent is present in an amount up to about 3 wt %, and more preferably, about 0.5 wt % to about 1 wt %, based on the weight of the ceramer solids. Combinations of different leveling agents can be used if desired.

Polymeric materials are known to degrade by a variety of mechanisms. Common additives that can offset such degradation are known as stabilizers, UV-absorbers, antioxidants, and the like. The ceramer compositions can include one or more of the following: ultraviolet stabilizer, ultraviolet absorber, ozone stabilizer, thermal stabilizer, or antioxidant.

A photostabilizer and/or ultraviolet absorber can be used to improve weatherability and reduce "yellowing" of a ceramer or hardcoat. An example of a photostabilizer includes that available under the trade designation TINUVIN 292 (bis(1,2,2,6,6-pentamethyl-4-piperidinyl)sebacate) and an example of an ultraviolet absorber includes that available under the trade designation TINUVIN 1130 (hydroxyphenyl benzotriazole), both of which are available from Ciba-Chemicals. Preferably, the ultraviolet stabilizer or absorber is present in an amount up to about 10 wt %, and more preferably, about 1 wt % to about 5 wt %, based on the weight of the ceramer solids. Combinations of different ultraviolet stabilizers and absorbers can be used if desired.

Method of Preparing Ceramer Composition and Ceramer Coating

To prepare a ceramer composition, a binder precursor, inorganic oxide particles, and the optional coupling agent or other optional ingredients, can be combined or mixed together in any manner. The mixture can if desired be heated to remove volatiles and solvents used for the production or processing of these ingredients, e.g., water in the sol. The heating can optionally be in combination with mild vacuum (about 90 mm Hg), leaving behind mainly solid components of the ceramer composition. Once substantially all solvents are removed, the ceramer composition will generally be in the form of a liquid; this liquid may be suitable for processing, coating, or other handling, as is, or may benefit from solvent added in an amount sufficient to produce a ceramer solution having a solids content that will offer useful processing and coating properties. The ceramer solution can be filtered prior to application to a substrate, to remove any gel particles or other agglomerated materials. Filtering can be accomplished with a ten-, five-, or one-micron filter made of a material that is unreactive with the solvent or any of the components of the ceramer solution.

To facilitate processing the ceramer composition into a cured hardcoat composition, it can be preferred, but is not required, that the ceramer composition exhibit a relatively low melting point. Most preferably, the ceramer composition can be liquid at or near room temperature, and the ceramer composition or a ceramer solution thereof can have a viscosity that allows processing, e.g., pumping, circulation, extrusion, coating, forming, curing, or other handling, at or near room temperature. Although viscosities outside of the following ranges can be useful, and the viscosity of a ceramer composition or ceramer solution can be chosen depending on various conditions such as the coating thickness, application technique, and the type of substrate, the ceramer composition or a solution thereof can preferably exhibit a room temperature viscosity in the range from about 1–200 centipoise (cps), preferably from about 3–75 centipoise, more preferably about 4–50 centipoise, and most preferably about 5–20 centipoise. Preferably, the ceramer composition exhibits a high transparency, and preferably a refractive index in the range from about 1.3 to about 1.7, as measured with a conventional refractometer using a conventional measurement procedure, such as ASTM D1747-94 ("Standard Test Method for Refractive Index of Viscous Materials").

A ceramer composition, optionally in the form of a ceramer solution including added solvent, can be applied to a substrate by techniques such as spray coating, knife coating, dip coating, flow coating, roll coating, and the like. The coating thickness of the ceramer composition will depend on the formulation, the amount of solvent, and the desired thickness of the cured hardcoat. Any solvent can be dried or flashed off at a temperature suitable for the solvent used.

Once solvent is removed, the ceramer composition can be exposed to an energy source to initiate curing the ceramer composition to form a hardcoat composition comprising inorganic oxide particles suspended, dispersed, or otherwise contained within or bound by a brominated polymeric matrix. This energy source can be thermal energy, electron beam, ultraviolet light, or visible light, or the like. The amount of energy required can be primarily dependent on the chemistry of the precursor composition, as well as its thickness and density. For thermal energy, the oven temperature will typically range from about 50° C. to about 250° C. (preferably about 90° C. to about 110° C.) for about 15 minutes to about 16 hours. Electron beam radiation can be used at an energy level of about 0.1 megarad to about 10 megarad (Mrad), preferably at an energy level of about 1 Mrad to about 10 Mrad. Ultraviolet radiation refers to nonparticulate radiation typically having a wavelength within the range of about 200 to about 400 nanometers, preferably within the range of about 250 to 400 nanometers. It is preferred that UV light have an energy level of at least 300 Watts/inch (120 Watts/cm), preferably at least 600 Watts/inch (240 Watts/cm). Visible radiation refers to non-particulate radiation having a wavelength within the range from about 400 nanometers (nm) to about 800 nm, preferably in the range from about 400 nm to about 550 nm. Optionally, the ceramer composition can be cured in an inert atmosphere (i.e., minimal oxygen present) such as a nitrogen atmosphere.

Typically, a cured ceramer composition (also referred to as "hardcoat" or "hardcoat composition") can have a thickness of at least about 1 micron, preferably at least about 2 microns, more preferably less than about 50 microns, more preferably less than about 25 microns, even more preferably less than about 10 microns, and most preferably less than about 4 microns. The amount of the ceramer composition, or a solution thereof, applied to a substrate can be adjusted to provide this coating thickness.

The hardcoat composition of the invention can be useful in applications where an abrasion or scratch resistant coating is desired, for example to protect other layers of a composite structure. The hardcoat can exhibit advantages of especially desirable optical properties, e.g., a high index of refraction or an index of refraction that can be controlled by changing the relative amount or chemical composition of one or more of the ingredients of the ceramer composition, such as the polymerizable brominated compound or the inorganic oxide particles.

The hardcoat can be used to alter optical properties, such as reflective properties, of a substrate which it contacts. That is, the hardcoat may provide a reflective or mirror-like property to a substrate, or it may provide an antireflective property. The hardcoat can be especially useful in optically functional composite structures wherein the index of refraction of the hardcoat composition can be made similar to the index of refraction of an adjacent layer, thereby reducing reflectance at the interface and enhancing transmission of light through the composite structure.

The hardcoat can have desirable physical, mechanical, and optical properties, including one or more of: a desired index of refraction; good scratch resistance; a relatively high hardness; and desired reflective or antireflective properties. For instance, the hardcoat can have an index of refraction that matches an adjacent layer of a composite article (e.g., about 1.58 for polycarbonate or about 1.65 for PET), or if a maximum refractive index is desired, an index of refraction that is at least about 1.5, 1.7, 1.8, or 2.0 or greater. The hardcoat may have a hardness that passes the pencil hardness test using a 1H pencil, preferably a 3H pencil. And the hardcoat can preferably have a reflectivity less than about 4%, e.g., less than about 1%.

An optically functional structure can comprise the cured ceramer hardcoat composition contacting a substrate. The substrate can be a component of a light management device, e.g., in the form of a film, sheet, prism, a filter, an optical element such as a lens, a light conducting pipe, a computer screen, a CRT face plates, any of these including a microstructured surface, or any other form of light conducting device. It is possible that more than one layer of a ceramer coating may be applied to a surface of a substrate, and that each layer has the same or different physical or optical properties.

Suitable substrates can be flat or microstructured, stiff or flexible, or can have other physical or structural properties known in the art of optical materials, and can be made from any material such as glass, a polymeric material such as a plastic or thermoplastic, or metal. The substrate can be a laminate of two or more different materials adhered together, either with or without an adhesive layer between. The substrate thickness can vary and typically ranges from about 0.1 mm to about 1000 mm, more typically from about 10 mm to about 200 mm, and most preferably from about 10 mm to about 0.25 mm. Flexible organic film substrates are typically no greater than about 1 mm thick.

Optically transparent substrates can be of an optically transmissive thermoplastic material (e.g., plastic sheets, films, or bodies having transmissivities over visible wavelengths of at least 25% to about 99% without marked absorption or reflection peaks in this range). Representative transparent substrates include polyesters such as poly (ethyleneterephthalate) "PET", polycarbonates, poly(meth) acrylates, polyphenyleneoxide, cellulose esters, such as cellulose acetate, cellulose diacetate, cellulose triacetate, and cellulose acetate-butyrate copolymer "CAB", polystyrene and styrene copolymers such as acrylonitrile-butadienestyrene copolymer and acrylonitrile-styrene copolymer, polyolefins, such as polypropylene and polyethylene, polyvinyl chloride, polyimides, and the like. "Poly(meth) acrylate" includes acrylates and methacrylates commonly referred to as cast acrylic sheeting, stretched acrylic, poly (methylmethacrylate) "PMMA," poly(methylacrylate), poly (ethylacrylate), and poly(methylmethacrylate-co-ethylacrylate), and the like.

The substrate may include a primed surface, which can be provided by a chemical primer layer or by other methods such as chemical etching, electron-beam irradiation, corona treatment, plasma etching, or coextrusion of adhesion promoting layers. Flexible substrates that contain primed surfaces are commercially available. An example of such a material is a polyethylene terephthalate film primed with an aqueous acrylic latex, which is available from DuPont Films, Hopewell, Va. under the trade designation Melinex 453, 454, 505, or 617. Another particularly preferred substrate is cellulose diacetate from Courtlands Plastic of Derby England, and marketed under the trade name Clarifoil.

Optically Functional Coating

An optically functional coating can be a component of an optically functional composite, e.g., as a layer adjacent to the hardcoat composition.

As described in *Optical Thin Film User's Handbook* by James D. Rancourt, MacMillan Publishing Co., 1987, optically functional coatings may be formed from suitably deposited thin films of metals (including metalloids) or alloys thereof, such as silver, gold, aluminum, palladium, and palladium-gold. One of the most versatile classes of materials used in the deposition of optically functional coatings are metal oxides such as oxides of single metals (including metalloids) as well as oxides of alloys thereof. Examples of particular metal oxides that have been used in optical coatings include oxides of aluminum, silicon, tin, titanium, niobium, zinc, zirconium, tantalum, yttrium, cerium, tungsten, bismuth, indium, and mixtures thereof, such as $Al_2O_3$, $SiO_2$, $SnO_2$, $TiO_2$, $Nb_2O_5$, ZnO, $ZrO_2$, $Ta_2O_5$, $Y_2O_3$, $CeO_2$, $WO_3$, $Bi_2O_5$, $In_2O_3$, and ITO (indium tin oxide). Metal oxides that are depleted in oxygen (i.e., where the amount of oxygen in the oxide is less than the stoichiometric amount), such as $SiO_x$, where x is no greater than 2, have also been used. One method of synthesizing such oxygen deficient oxides is by reactive sputtering.

One of the reasons for the versatility of metal oxides in optically functional coatings is that unlike other materials, they may be used to deposit both reflective or antireflective coatings depending on the configuration of the oxide coating and its chemical composition. Thus, as discussed in International Publication Document WO 96/31343 (Bright), when a single thin layer of metal oxide, such as ITO, having a thickness of about 50 Angstroms to about 3000 Angstroms is deposited over a transparent plastic film, such as polyester or polycarbonate, the amount of light reflected by the polyester or polycarbonate increases substantially. In this case the ITO film acts as a "reflective" coating. On the other hand, when alternating layers of ITO and $SiO_2$ or ITO and $SiO_x$ with a combined thickness of about 50 Angstroms to about and 3000 Angstroms are deposited over the polyester or polycarbonate substrate, the amount of light reflected by the polyester or polycarbonate decreases substantially. In this case the alternating ITO/$SiO_x$ stack acts as an "antireflective" coating.

Another reason for the versatility of metal oxide coatings, particularly ITO, is that they can be made electrically conductive by doping with a conductive element, such as tin, aluminum, barium, boron, or antimony. When made conductive, the metal oxides also help reduce static charge and electromagnetic emissions.

Whether an optically functional coating is "reflective" or "antireflective" depends on its overall refractive index relative to the refractive index of the underlying substrate. The simplest reflective coating is a single thin layer of a transparent material, such as a metal or metal oxide, having a refractive index higher than the refractive index of the underlying substrate. When the substrate is a transparent organic polymeric material, such as polyester or polycarbonate, the simplest "reflective" coating is generally chosen to be a single thin layer of a material, such as a metal or metal oxide, having a refractive index of about 1.6 to about 2.7. This is because most organic polymeric materials have indices of refraction of about 1.3 (for fluorinated polymers) to about 1.7 (for aromatic polymers). Fluorinated thermoplastic polymers, such as TEFLON (1.35), have the lowest indices of refraction among organic polymers, whereas aromatic thermoplastic polymers, such as polystyrene (1.60) have some of the highest.

The simplest antireflective coating is a single layer of a transparent material having a refractive index lower than that of the substrate on which it is disposed. Multilayer antireflective coatings include two or more layers of dielectric material on a substrate, wherein at least one layer has a refractive index higher than the refractive index of the substrate. The multilayer coatings are generally deposited by thermal evaporation, sputtering, or other vacuum deposition techniques. Such multilayer coatings are disclosed, for example, in International Publication No. WO 96/31343 (Southwall Technologies Inc.), U.S. Pat. No. 5,091,244 (Bjornard), U.S. Pat. No. 5,105,310 (Dickey), U.S. Pat. No. 5,147,125 (Austin), U.S. Pat. No. 5,270,858 (Dickey), U.S. Pat. No. 5,372,874 (Dickey et al.), U.S. Pat. No. 5,407,733 (Dickey), and 5,450,238 (Bjornard et al.)

Antireflective (AR) film stacks prepared by vacuum sputtering of metal oxide thin films on substrates made of substrates, particularly flexible plastic substrates, such as polycarbonate, acrylic, polystyrene, and polyesters are described, for example, in U.S. Pat. No. 5,579,162 (Bjornard et al.) and International Publication No. WO 96/31343 (Southwall Technologies Inc.).

An embodiment of the invention can be an anti-reflective composite as shown in FIG. 1, which illustrates optically-functional (anti-reflective) composite structure 2 comprising substrate 4, optionally primed on one or two sides with primer 6, and contacting on one side adhesive 8 and on the other side hardcoat composition 10. An antireflective (AR) layer 12 or stack can be provided on hardcoat 8, and an anti-smudge layer 14 can be provided on AR stack 12. In this embodiment of the invention, the hardcoat acts as an adhesion promoter between the AR layer and the substrate, which otherwise may not adhere well to a thermoplastic substrate. The hardcoat also modifies the mechanical properties of the AR layer, making it less susceptible to fracture. Preferably in this embodiment the index of refraction of the hardcoat can be chosen to match the index of refraction of the substrate, minimizing reflection from occurring at this interface.

Test Methods

Test Procedure 1: Pencil Hardness

This test was run according to ASTM D3363-92a (Standard Test Method for Film Hardness by Pencil Test). This test method covers a procedure for rapid determination of the film hardness of an organic coating on a substrate in terms of drawing leads or pencil leads of known hardness. According to this test method, test samples were cut to approximately 1 inch by 8 inches in size and placed on a clean glass sheet. The carefully planarized tip of a lead pencil of specified hardness was held firmly against the sample at a 45° angle and pushed at about 5 cm/sec. The weight on the pencil was 1000 g. The process started with the hardest pencil and continued down the scale of hardness to the pencil that will not scratch the film. Each sample was tested five times at each hardness level. To pass, at least four of the five tests pass the hardness level. Uni Hardness Pencils (manufactured by Mitsubishi, Japan) were used throughout this test.

Test Procedure 2: Index of Refraction

The refractive index of resin compositions and cured films were measured using an Abbe Refractometer, made by Erma Inc. of Tokyo Japan and distributed by Fisher Scientific.

Materials

Preparation of 4,6-dibromo-2-sec-butyl phenyl acrylate (DBsBPA)

In an appropriately sized round bottom flask equipped with a mechanical stirrer, condenser, nitrogen cap, addition funnel and temperature probe, 850 g (grams) of 2-sec-butylphenol was mixed with 5097 g of deionized water. The mixture was stirred with a mechanical mixer and purged with nitrogen for about 10 minutes. 1881 g bromine was added to the mixture drop-wise through the addition funnel. The reaction temperature was maintained at about 30° C. or less using an ice bath. Following the addition of the bromine, the reaction mixture was stirred for 30 minutes at room temperature. Reaction completion was determined by gas chromatography, by monitoring the disappearance of the starting material and of monobrominated species.

Upon completion of the reaction, 4487 g of ethyl acetate was added. The mixture was stirred for 15 minutes and then allowed to phase split. The bottom (aqueous) layer was removed and 750.5 g of a 13 wt % aqueous sodium hydrosulfite solution was added. The mixture was stirred well and then allowed to phase split. The bottom (aqueous) layer was removed and 856.4 g of a 13 wt % aqueous sodium chloride solution was added. The mixture was stirred well and then allowed to phase split. The bottom (aqueous) layer was removed and solvent was stripped from the top layer using a rotary evaporator.

The crude product was then distilled using a distillation head and vigeraux column. The product distilled at 0.1 mm Hg, a pot temperature of 151° C., and a head temperature of 97° C. This procedure provided approximately 1500 g of 4,6-dibromo-2-sec-butyl phenol (DBsBP).

In an appropriately sized round bottom flask equipped with a mechanical stirrer, condenser, addition funnel and temperature probe, 140 g of 4,6-dibromo-2-sec-butyl phenol, 360 g of t-butyl methyl ether, 55.2 g triethyl amine, and 0.02 g phenothiazine were mixed (in these examples, the base used was triethyl amine; however, a stoichiometric amount of any other appropriate bases could also be used, such as sodium hydroxide or pyridine, among others). 47.3 g of acryloyl chloride was added drop wise and, using an ice bath, the reaction temperature was maintain below 20° C. The reaction was run to completion, taking approximately 30 minutes.

The product was then worked up by sequential washings with deionized water (257 g); 0.7% (w/w) aqueous hydrochloric acid (51 g); 16.1% (w/w) aqueous sodium carbonate (59.6 g); and 8.3% (w/w) aqueous sodium chloride (54.5 g). Solvent was removed using a rotary evaporator and the crude product was vacuum distilled to yield 155 grams (94%) of 4,6-dibromo-2-sec-butyl phenyl acrylate (DBsBPA).

Preparation of 2-(4,6-dibromo-2-sec-butyl phenoxy) ethyl acrylate (DBsBPEA)

In a 12 liter round bottom flask equipped with a mechanical stirrer, condenser, nitrogen cap, addition funnel and temperature probe, 1500 g (grams) of 2-sec-butylphenol was mixed with 4500 g of deionized water. The mixture was stirred with a mechanical mixer and purged with nitrogen for about 10 minutes. 3319 g bromine was added to the mixture drop-wise through the addition funnel. The temperature was maintained at about 30 C. or less using an ice bath. Following addition of the bromine, the reaction mixture was stirred for one hour at room temperature. Reaction completion was determined by gas chromatography, by monitoring the disappearance of the starting material, 2-sec-butylphenol, and of monobrominated species.

Upon completion of the reaction, 3960 g of ethyl acetate was added. The mixture was stirred for 15 minutes and then allowed to phase split. The bottom (aqueous) layer was removed and 2686 g of a 13 wt % aqueous sodium hydrosulfite solution was added. The mixture was stirred well and then allowed to phase split. The bottom (aqueous) layer was removed and 2760 g of a 15 wt % aqueous sodium carbonate solution was added. The mixture was stirred well and then allowed to phase split. The bottom (aqueous) layer was removed and solvent was stripped from the top layer using a rotary evaporator. This procedure provided approximately 2647 g of DBsBP.

A 500 ml round bottom flask was equipped with a magnetic stirrer, condenser and temperature probe. 40 g of the 4,6-dibromo-2-sec-butylphenol, 12.5 g ethylene carbonate and 13.1 g triethylamine were added to the flask. The mixture was heated to reflux (~120 C.) and held at that temperature for about 24 hours. At this point, gas chromatograph analysis showed only 0.9% residual starting material, so the reaction was cooled to room temperature. 170 g t-butyl methyl ether was added, then 20.1 g of 37% HCl in 150 g of DI water was added. The mixture was shaken well and allowed to phase split and the lower aqueous phase removed. The mixture was then washed with a solution of 150 g water and 15 g of sodium carbonate and the lower aqueous phase was removed. The solvent was remove using a rotary evaporator to yield about 40 grams of dark intermediate product. This product batch distilled using a 163 C. pot, 115 C. overhead temperature and 0.2 mm Hg vacuum to yield the yellow desired product, 2-(4,6-dibromo-2-sec-butyl phenoxy) ethanol.

A 500 ml round bottom flask was equipped with a mechanical stirrer, Dean-Stark trap, condenser, and temperature probe. 25 g of 2-(4,6-dibromo-2-sec-butylphenoxy) ethanol, 125 g of toluene, 0.58 g of p-toluene sulfonic acid, 5.5 g of acrylic acid and ~200 ppm each of methyl hydroquinone and hydroquinone were mixed together in the flask. The mixture was heated to reflux to azeotrope out the water generated during esterification. After 5 hours, gas chromatography analysis showed the reaction to be substantially complete (>98%). The reaction mixture was cooled, then washed three times: first with a solution of HCl in water, then with a solution of $NaCO_3$ in water and finally with a solution of NaCl in water and finally the toluene was then stripped in vaccuo. The product was purified using continuous distillation on a rolled film evaporator (available from UIC Inc. of Joliet, Ill.) at the following conditions: 1 micron Hg vacuum and 130 C. to obtain the product with >98% purity by NMR.

Component A 50.01 parts by weight of PETA (pentaerythritol triacrylate) were heated to about 49° C. (120° F.). 31.48 parts by weight Nalco 2327 colloidal silica (sold as a 40% sol by Nalco Corp., Naperville, Ill.) were added to form a first admixture. In a separate one liter flask, 7.91 parts by weight of 3-methacryloxypropyl-trimethoxysilane were mixed with 8.06 parts by weight N,N-dimethyl acrylamide (DMA) to form a second admixture. The first admixture was mixed with the second admixture to form a third admixture. In a weighing tray, 0.039 parts by weight BHT (butylated hydroxytoluene) and 0.004 parts by weight phenothiazine were mixed together and then added to the third admixture to form a fourth admixture.

The fourth admixture was stripped by application of gentle vacuum distillation (100±20 mm Hg) at 52°±2° C. until most of the water from the sol was removed. At the end of the stripping process, the admixture was diluted to 50% solids with a 16:1 mixture of isopropyl alcohol:deionized water (w/w). 1.63 parts by weight (solids) photoinitiator (Irgacure™ 184) was then added.

Component B 56.2 parts by weight of the curable binder precursor PETA (pentaerythritol triacrylate) was heated to about 49° C. (120° F.) in a one liter flask. 34.5 parts by weight Nalco 2327 colloidal silica (sold as a 40% sol by Nalco Corp., Naperville, Ill.) and 0.7 parts of sodium aluminate (available from Matheson, Coleman and Bell, Norwood, Ohio) were added to the PETA to form a first admixture. In a separate one liter flask, 7.7 parts by weight of the crosslinkable silane component 3-methacryloxypropyl-trimethoxysilane, (commercially available from Union Carbide under the trade designation "A-174") were mixed with 0.8 parts by weight of FC405 (a fluoro/silane component commercially available from Minnesota Mining and Manufacturing Company, St. Paul, Minn.) to form a second admixture. The first and second admixtures were then mixed together to form a third admixture.

In a weighing tray, 0.15 parts by weight BHT (butylated hydroxytoluene) and 0.02 parts by weight phenothiazine (both based on the 56.2 parts by weight PETA) were mixed together and then added to the third admixture to form a fourth admixture. The fourth admixture was then stripped, i.e., subjected to a gentle vacuum distillation (100±20 mm Hg) at 52°±2° C. until most of the water from the sol was removed. At the end of the stripping process, the admixture was diluted to 25% solids with a 14:1 weight-ratio of isopropyl alcohol:distilled water. About 0.7 parts by weight (solids) photoinitiator were also added (commercially available from Ciba Geigy Corp., Hawthorne, N.Y., under the trade designation Irgacure™ 184).

Component C 56.2 parts by weight of the curable binder precursor PETA (pentaerythritol triacrylate) was heated to about 49° C. (120° F.) in a one liter flask. 31.7 parts by weight Nalco 2327 colloidal silica (sold as a 40% sol by Nalco Corp., Naperville, Ill.) and 3.5 parts of colloidal zirconia (sold as a 20% colloidal zirconia acetate sol by The PQ Corporation, Ashland, Mass.) were added to the PETA to form a first admixture. In a separate one liter flask, 7.7 parts by weight of the crosslinkable silane component 3-methacryloxypropyl-trimethoxysilane, (commercially available from Union Carbide under the trade designation "A-174") were mixed with 0.8 parts by weight of FC-405 (a fluoro/silane component commercially available from Minnesota Mining and Manufacturing Company, St. Paul, Minn.) to form a second admixture. The first and second admixtures were then mixed together to form a third admixture.

In a weighing tray, 0.15 parts by weight BHT (butylated hydroxytoluene) and 0.02 parts by weight phenothiazine (both based on the 56.2 parts by weight PETA) were mixed together and then added to the third admixture to form a fourth admixture. The fourth admixture was then stripped, i.e., subjected to a gentle vacuum distillation (100±20 mm Hg) at 52°±2° C. until most of the water from the sol was removed. At the end of the stripping process, the admixture was diluted to 25% solids with a 14:1 weight-ratio of isopropyl alcohol:distilled water. About 0.7 parts by weight (solids) photoinitiator were also added (commercially available from Ciba Geigy Corp., Hawthorne, N.Y., under the trade designation Irgacure™ 184).

Components D, E, F, G

High index of refraction (HIR) components for ceramers were prepared by mixing the materials outlined in Table 1 below in a glass container. All values indicate the weight percent of the material based on the total HIR composition.

TABLE 1

| | HIR Components | | | |
|---|---|---|---|---|
| Component | D | E | F | G |
| RDX-51027 | 55 | — | 55 | — |
| Methyl Styrene | 7 | 9 | 7 | 9 |
| DBsBPA | 15 | 15 | — | — |
| DBsBPEA | — | — | 15 | 15 |
| CN-104 | 20 | 73 | 20 | 73 |
| Ebercryl ™ 3603 | 3 | 3 | 3 | 3 |

DBsBPA   4,6-dibromo-2-sec-butyl phenyl acrylate
DBsBPEA   2-(4,6-dibromo-2-sec-butyl phenoxy) ethyl acrylate
RDX 51027   brominated epoxy acrylate available from UCB Corporation
CN-104   epoxy acrylate by Sartomer Company
Ebercryl ™ 3603   novolac epoxy acrylate by UCB Company Additionally, Lucirin™ TPO (diphenyl(2,4,6-trimethylbenzoyl) phosphine oxide from BASF, Charlotte, N.C.) and Irgacure™ 184 (1-hydroxycyclohexyl phenyl ketone from Ciba Specialty Chemicals Corp., Tarrytown, N.Y.) were each added to the mixture in amounts of 1.5 parts TPO per hundred parts HIR component, and 3.0 parts Irgacure-184 per hundred parts HIR component.

EXAMPLES 1–4

Example 1 was prepared by mixing four parts of component A with one part of component D.

Example 2 was prepared by mixing four parts of component A with one part of component E.

Example 3 was prepared by mixing four parts of component A with one part of component F.

Example 4 was prepared by mixing four parts of component A with one part of component G.

Each mixture, which contained approximately 60% solids, was coated on a 10 inch square of 5 mil Melinex 617 polyester film (manufactured by DuPont Films) using a #4 Meyer rod (manufactured by RD Specialties, Rochester, N.Y.). The samples were placed in a 50° C. oven for approximately one minute to evaporate the solvent. After the solvent was evaporated, the coated films were passed twice under two 300 watts/cm UV lamps (manufactured by Fusion UV Curing Systems, Rockville, Md.) at a rate of 15 ft/minute. The coating was cured in air and had a thickness of 4 to 6 micrometers. The refractive index was measured on the cured ceramers and the pencil hardness of the cured films was determined. The results are shown in Table 2 below.

TABLE 2

| Example | HIR Component | Index of Refraction* | Pencil Hardness |
|---|---|---|---|
| 1 | D | 1.544 | 3H |
| 2 | E | 1.525 | 2H |
| 3 | F | 1.531 | 2H |
| 4 | G | 1.530 | 1H |

*refractive index of cured ceramer

EXAMPLES 5–6

Example 5 was prepared by mixing four parts of component B with one part of 4,6-dibromo-2-sec-butyl phenyl acrylate (DBsBPA).

Example 6 was prepared by mixing four parts of component C with one part of 4,6-dibromo-2-sec-butyl phenyl acrylate (DBsBPA).

The ceramer compositions were coated on a polyester film substrate at a thickness of 4 to 5 micrometers using conventional flow coating techniques. Each coated substrate was flash dried at 60° C. for 2.5 minutes in an air circulating oven to ensure that the majority of the isopropanol was driven off. The ceramer coating was cured on a conveyor belt of a UV light processor using a high pressure mercury lamp (Model QC 1202 manufactured by Fusion UV Curing Systems, Rockville, Md.); process conditions were 55 feet/minute, 410 volts, energy 90 mJ/cm$^2$ and atmospheric air. The index of refraction and pencil hardness of the cured films were determined. The results are shown in Table 3 below.

TABLE 3

| Example | Component | Index of Refraction* | Pencil Hardness |
|---|---|---|---|
| 5 | B | 1.542 | 1H |
| 6 | C | 1.515 | — |

*refractive index of cured ceramer film

EXAMPLE 7

Particle Preparation

In a nitrogen filled glovebox, 1.7 grams of hexanoic acid was rapidly added to 10 grams tetrabutyl titanate in a 20 milliliters screw cap glass vial and shaken vigorously. Outside of the nitrogen filled glovebox, 0.93 gram deionized water was added to the solution and the solution was vigorously shaken for one minute, then transferred to a 23 milliliter Teflon lined non-stirred, pressure vessel (Pressure Vessel Model # 4749, commercially available from Parr Instruments Co., Moline, Ill.) that was purged with nitrogen for 1 minute. The reactor was heated to 235 C. for approximately 5 hours. Upon cooling, the solution was nearly colorless and contained a white precipitate. The precipitate was separated from the liquid by placing the slurry into centrifuge bottles which were centrifuged at 2500 rpm for 10 minutes using an International Equipment Company Model EXD centrifuge, commercially available from Fisher Scientific Company, Pittsburgh, Pa. The liquid was decanted. Further purification of the particles was accomplished by resuspending the particles in a fresh portion of hexane and then centrifuging the slurry at 2500 rpm for 10 minutes followed by decanting the hexane.

Preparation of Coupling Agent/Dispersing Agent

Under dry nitrogen, 7.24 grams 4,6-dibromo-2-sec-butylphenylacrylate, from Minnesota Mining and Manufacturing Company, St. Paul, Minn., was added dropwise to 1.96 grams of stirred 3-mercaptopropyltrimethoxysilane and 0.18 gram triethylamine. The solution warmed slightly upon addition of the acrylate. The mixture was allowed to stir 12 hours at room temperature. The triethylamine was removed under vacuum (ca. $10^{-1}$ Torr) to provide 4,6-$Br_2$-2-$C_4H_9$-$C_6H_2$-OC(O)$(CH_2)_2$S$(CH_2)_3$Si$(OCH_3)_3$.

Attaching Coupling Agent/Dispersing Agent to the Metal Oxide Particle

Metal oxide particles (calculated as 2.28 grams of titanium dioxide) were added to 40 milliliters 2-butanone containing 0.35 gram 4,6-$Br_2$-2-$C_4H_9$-$C_6H_2$-OC(O)$(CH_2)_2$S$(CH_2)_3$Si$(OCH_3)_3$ and 0.35 gram 3-methacryloyloxypropyl-trimethoxysilane. The mixture was heated to 68° C. with continuous stirring for 1.5 hours. The mixture was combined with 0.35 gram of a dilute ammonium hydroxide solution (8 drops of aqueous 30 percent ammonium hydroxide mixed with 3.64 grams deionized water mixed with 3 milliliters of 2-butanone) at 68 C. The temperature was reduced to 45 C. and the colloid stirred 12 hours. The transparent colloid was concentrated until the 2-butanone ceased to distill using a rotary evaporator (30 C.). Approximately 40 milliliters of hexane was added to the mixture and stirred for 1 hour and resulted in the immediate precipitation of weakly flocced particles. The slurry was transferred to centrifuge bottles and centrifuging the slurry at 2500 rpm for 10 minutes followed by decanting the supernate. Further purification of the particles was accomplished by resuspending the particles in a fresh portion of hexane and then centrifuging the slurry at 2500 rpm for 10 minutes followed by decanting the hexane. The titania particles were dispersed in 30 milliliters of 2-butanone forming a transparent pale yellow, colloidal solution.

Formation of Ceramer

The colloidal suspension was combined with 0.2 gram 4,6-dibromo-2-sec-butylphenylacrylate and 0.05 gram Irgacure™ 4265. A portion of the 2-butanone was removed by vacuum distillation until the volume of the sample was approximately 5 milliliters. For purposes of measuring the refractive index, the ceramer composition of was placed on a silicon substrate (commercially available from Monsanto, St. Louis, Mo.) between two 50 microns thick tape strips spaced 2 centimeters apart. The ceramer composition was spread between the silicon wafer and a polyester liner by pressing the assembly together on a flat surface with a 2500 grams steel coating bar. The polyester liner was removed by peeling and the film was cured on the silicon wafer, in the presence of nitrogen, at a translation speed of 20 feet/minute using a UV curing station (Model # MC-6RQN, commercially available from Fusion System Corp., Rockville, Md., with a "D" bulb). The cured film was then placed in an oven at 80 C. for 2 hours to drive off any residual 2-butanone. The refractive index of the cured film was determined to be 2.01 by scanning laser confocal microscope available from Leica Lasertechnik Gmbh of Heidelberg, Germany.

What is claimed is:

1. A cured hardcoat composition comprising:

(a) a brominated polymer comprising monomeric units derived from a polymerizable composition comprising
      (i) an aromatic brominated (meth)acrylate compound of formula (I)

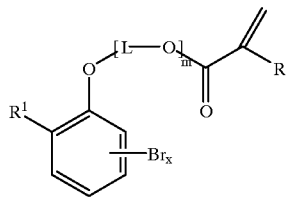

formula (I)

wherein:
R is hydrogen or methyl;
R¹ is a straight or branched alkyl;
L is a straight or branched alkylene;
x is an integer from 1 to 4; and
m is an integer from zero to 1; and (b) substantially non-agglomerated, inorganic oxide particles that are less than about 50 nanometers in size, selected from the group consisting of silica, titania, alumina, zirconia, and mixtures thereof;
wherein the cured hardcoat composition has an index of refraction of at least about 1.5, and a pencil hardness of greater than or equal to 1H.

2. A composite structure comprising:
(a) a substrate having a first and a second surface,
(b) a hardcoat layer comprising:
(i) an aromatic brominated (meth)acrylate compound of formula (I)

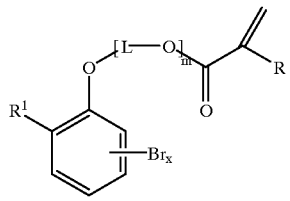

formula (I)

wherein:
R is hydrogen or methyl;
R¹ is a straight or branched alkyl;
L is a straight or branched alkylene;
x is an integer from 1 to 4; and
m is an integer from zero to 1; and (c) substantially non-agglomerated inorganic oxide particles that are less than about 50 nanometers in size, selected from the group consisting of silica, titania, alumina, zirconia, and mixtures thereof;
wherein the hardcoat layer has an index of refraction of at least about 1.5, and a pencil hardness of greater than or equal to 1H.

3. The composite structure of claim 2 wherein the composition further comprises an optically functional antireflective coating.

4. The composite structure of claim 2 wherein the substrate comprises polycarbonate or poly (ethyleneterephthalate).

5. The composite structure of claim 2 wherein the hardcoat layer exhibits an index of refraction approximately equal to the index of refraction of the substrate.

6. The composition of claim 1 wherein said composition further comprises a coupling agent.

7. The composition of claim 6 wherein said coupling agent is an organofunctional silane monomer.

8. The composition of claim 6 wherein said coupling agent is a carboxylic acid-functional compound.

9. The composite structure of claim 7 wherein said hardcoat layer further comprises a coupling agent.

10. The composite structure of claim 9 wherein said coupling agent is an organofunctional silane monomer.

11. The composite structure of claim 9 wherein said coupling agent is a carboxylic acid-functional compound.

12. The composition of claim 1 wherein said substantially non-agglomerated, inorganic oxide particles are about 10 nanometers to about 30 nanometers in size.

13. The composite structure of claim 2 wherein said substantially non-agglomerated, inorganic oxide particles are about 10 nanometers to about 30 nanometers in size.

* * * * *

UNITED STATES PATENT AND TRADEMARK OFFICE
CERTIFICATE OF CORRECTION

PATENT NO. : 6,261,700 B1
DATED : June 17, 2001
INVENTOR(S) : Olson, David B.

It is certified that error appears in the above-identified patent and that said Letters Patent is hereby corrected as shown below:

<u>Title page,</u>
Insert Item:
-- [73] Assignee: 3M Innovative Properties Company, St. Paul, MN (US) --.

<u>Column 6,</u>
Line 49, delete "4,6dibromo-2-isopropyl" and insert in place thereof
-- 4,6-dibromo-2-isopropyl --.

<u>Column 8,</u>
Lines 1-18, delete the following formula:

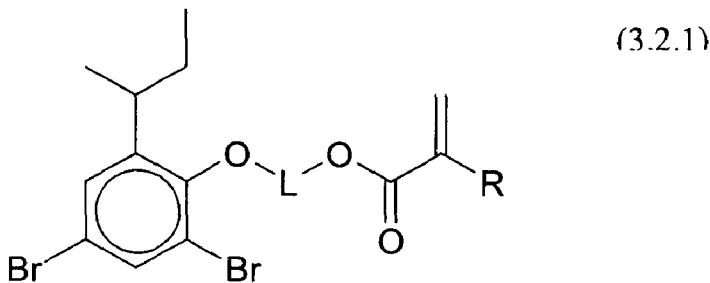

(3.2.1)

<u>Column 11,</u>
Line 24, delete "(meth)acrylamides," and insert in place thereof -- (meth)acrylamide, --.

<u>Column 12,</u>
Line 14, delete "(methacrylamide," and insert in place thereof -- (meth)acrylamide, --.

<u>Column 13,</u>
Line 3, delete "the and" and insert in place thereof -- and the --.

<u>Column 14,</u>
Line 4, delete "company," and insert in place thereof -- Company, --.

<u>Column 20,</u>
Line 39, delete "plates," and insert in place thereof -- plate, --.

<u>Column 23,</u>
Line 57, delete "maintain" and insert in place thereof -- maintained --.

<u>Column 28,</u>
Line 44, delete "of was" and insert in place thereof -- was --.

UNITED STATES PATENT AND TRADEMARK OFFICE
CERTIFICATE OF CORRECTION

PATENT NO.    : 6,261,700 B1
DATED         : June 17, 2001
INVENTOR(S)   : Olson, David B.

It is certified that error appears in the above-identified patent and that said Letters Patent is hereby corrected as shown below:

<u>Column 30,</u>
Line 29, delete "claim 7" and insert in place thereof -- claim 2 --.

Signed and Sealed this

Fifteenth Day of November, 2005

JON W. DUDAS
*Director of the United States Patent and Trademark Office*